(No Model.)
F. GROSHANS.
FENDER FOR RAILROAD CARS.
No. 499,882. Patented June 20, 1893.
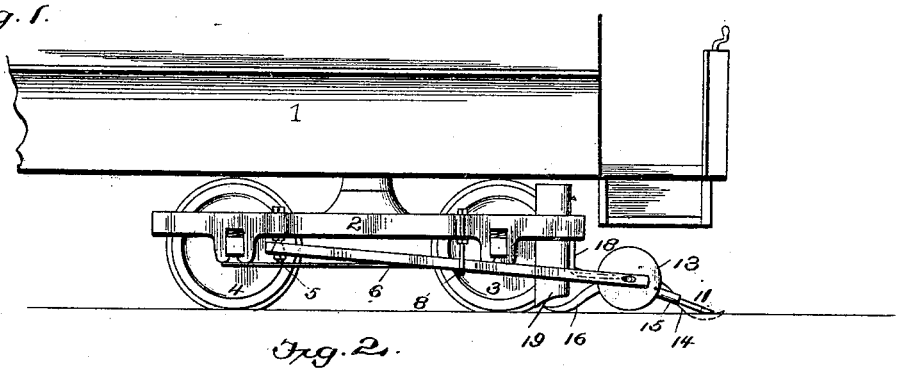
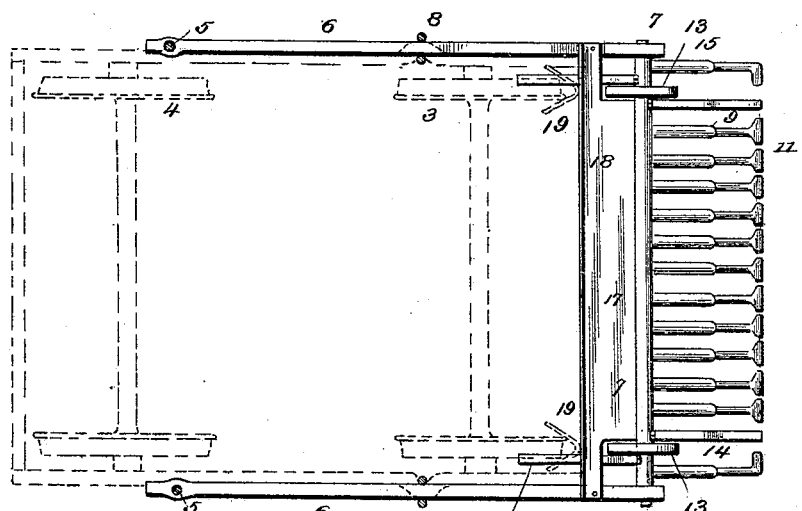
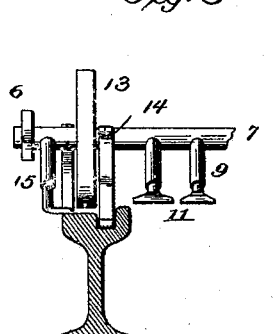
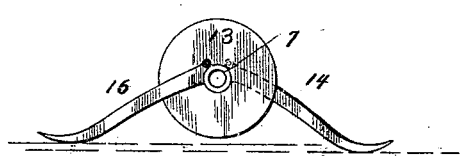
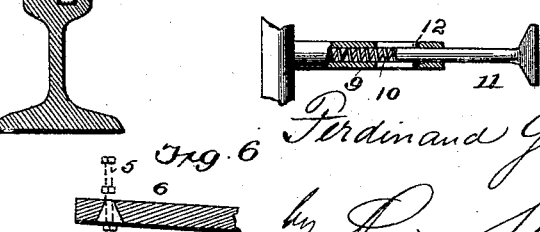
Ferdinand Groshans,
Inventor

UNITED STATES PATENT OFFICE.

FERDINAND GROSHANS, OF BALTIMORE, MARYLAND.

FENDER FOR RAILROAD-CARS.

SPECIFICATION forming part of Letters Patent No. 499,882, dated June 20, 1893.

Application filed January 7, 1893. Serial No. 457,663. (No model.)

*To all whom it may concern:*

Be it known that I, FERDINAND GROSHANS, a citizen of the United States, and a resident of Baltimore, Maryland, have invented certain new and useful Improvements in Fenders for Railroad-Cars, of which the following is a specification.

My invention relates to a fender for street cars and has for its object to provide a street car with a running fender carried in front of the front wheels which will lie very close to the ground, sufficiently so as to catch any large object, such as the body of a child or man, and throw it on to a receiving table while at the same time being so constructed as to yield to the resistance of any stationary object which may be in its path, such for instance as a raised paving block.

In the drawings Figure 1 is a side elevation of the front of a car and the front truck thereof, showing the fender in position attached to the truck. Fig. 2 is a plan view of the fender in full lines and the truck in dotted lines. Fig. 3 is a front elevation of that portion of the fender which lies over the track and showing the track in section. Fig. 4 is an enlarged side view of the runner wheel which is on the exterior of the fender and showing the fingers which run on the track, back and front of it. Fig. 5 is a sectional view of one of my fender fingers. Fig. 6 is a detail showing the way in which the fender frame is pivoted to the truck at the rear.

In the drawings, 1 represents the car; 2 the truck; 3 the front wheel; 4 the back wheel thereof.

5 is a single bolt through the frame of the truck 2. Upon this bolt and a similar one on the opposite side of the truck, shown in Fig. 2, is hung the end of the fender frame which consists of a bar of wood or iron extending backward from the fender and attached to the truck by the bolt 5.

6—6 are the bars connected to the fender and suspended from the bolt 5. They extend forward to a cross bar 7 and together with that bar constitute the frame of the fender.

8—8 are link bolts passing through the frame 2 and forming saddles in which the bars 6—6 rest. These saddle bolts may be adjusted in such a way as to give to the fender any desired elevation above the surface of the ground.

The bar 7 is generally made of a pipe of iron. 9—9—9 are smaller pipes of iron, shown in section in Fig. 5, inserted into the pipe 7 and preferably screwed through the pipe into an abutment with the interior of said pipe at their rear ends, which gives them additional stiffness.

10 are springs inserted in the pipes, and 11 are plungers which fit in the pipes and are pressed forward by the springs. These fingers are held in place by pins 12—12 passing through them, and which reciprocate in slots in the sides of pipes 9—9. The pipes 9—9 are inserted into the pipe 7 at a distance of two or three or four inches apart and the ends of the fingers 11 are broadened out so as to make almost a continuous surface to the fender on its front extremity. These fingers 11 are prevented from turning by the pins 12—12. On either extremity of the bar 7 and immediately above the tread of the track is a runner wheel 13 which runs freely on the pipe 7 and which is intended to stand a little above the track, possibly one-fourth inch, so as not to touch it but to support the weight of the fender, should it fall for any reason, and carry it. Inside of the runner wheel 13 is a hinged finger 14, shown in Fig. 4, which is hinged to the bar 7 and extends forward as far or somewhat farther than the fingers 11—11 and is curved upward at the end. This finger rests in the groove of the rail and is intended for the purpose of cleaning out that groove and throwing off the track any stone or other thing which may be in the path of the wheel. Its elevation is adjusted by the abutment of its hinge.

15 is a finger similar to 11—11 which is outside of the runner wheel 13 and which is provided with an inwardly turned end instead of a T-shape end. This finger rests upon the tread of the rail outside of the runner and serves also the purpose of knocking a stone or other similar obstruction from the track.

16 is a finger similar to 14 hinged to the bar 7 and extending backward on to the tread of the rail. This finger serves the purpose of preventing any object which might fall upon the fender and which might be thrown off the fender and over the runner wheel from falling under the wheel of the truck.

Behind the bar 7 is a board 17 which rests upon said bar and the side bars 6—6 of the fender 3. On the rear end of the board 17 is a vertical bar 18 which closes the space between the board 17 and the truck and makes a clear box into which an object may fall when caught by the fender. In the rear of the bar 18 and supported by it are the wheel fenders 19—19 which consist of a piece of curved sheet iron bolted to the bar 18 and standing in front of the wheels.

The operation of the device is as follows: If a raised cobble stone or other stationary object is met with in the street by one of the fingers 11—11 it will be pushed in against its spring 10, raised above the surface of the ground and allowed to pass over the top of the cobble stone. If this yielding is not sufficient to carry it over the top of the stone, the stone will then bear upon its under surface, raise the whole fender frame which is pivoted at 5, and allow the whole obstruction to pass under it. If the stone is in the groove of the rail, (if a groove rail be used) or in the groove of the rail used on a curve, which is generally grooved, the finger 14 will throw that out. If the obstruction is on the tread of the rail the finger 15 will throw it off. If the rails are uneven so that one rail is raised above the other, the runner 13 will raise the whole fender and protect it. An object caught by the fender, such as the body of a child or man, will be thrown up on the board 17 and prevented from falling under the truck by the bar 18 and will be held there until recovered, there being nothing in its path to injure it. The wheels 3—3 of the truck are covered by fenders 19—19 and if the body of a person caught on the fender should fall off to the side, it will be prevented from falling under the wheels and thrown clear of the wheels by the fingers 16—16 which extend back from the fender and project beside the wheels 3—3.

Having thus described my invention, what I claim, and desire to secure by Letters Patent, is—

1. In a car fender the combination of a pivoted fender frame extending in front of the truck and provided with a series of independent fingers extending forward so as to rest close to the ground, substantially as described.

2. In a fender for railroad cars, the combination of a frame pivoted to the truck of a car and extending forward so that the frame stands in front of the wheels of the truck, and provided with fingers which extend forward from the frame in close proximity to the surface of the ground, said fingers being hinged to the frame so that they can ride over an obstruction, substantially as described.

3. In a fender for railroad cars, the combination of a fender frame pivoted to the truck and extending in front of the same and provided with forwardly projecting fingers which are arranged upon said frame upon springs adapted to yield to resistance offered to one or more of the fingers and thus ride over the obstruction.

4. In a fender for railroad cars, the combination of a pivoted fender frame extending in front of the truck, a series of fingers extending forward from the frame to the surface of the ground, and a box mounted upon the fender and in front of the truck to receive any object which may be caught by the fender.

5. In a fender for railroad cars, the combination of a fender frame pivoted to the truck and extending forward around the front of the truck and provided on its front with a series of fingers projecting forward to the surface of the ground, a box located in front of the truck to receive any object caught by the fender, and a pair of runner wheels standing above the track and in position to sustain the fender in case it should drop low enough for the fingers to touch the ground in front of the car, substantially as described.

6. In a fender for railroad cars, the combination of a fender frame pivoted to the truck and extending forward around the front of the truck, provided on its front with a series of yielding fingers which project forward to the surface of the ground, a box to receive any object caught by the fender, and a pair of hinged fingers on each end, one extending forward and the other backward upon the rail.

7. In a fender for railroad cars, the combination of a fender frame pivoted to the truck and extending forward around the front of the truck, provided on its front with a series of fingers which project downwardly toward the ground, which fingers consist of a sleeve and a plunger reciprocating therein, with a spring behind the plunger to force it forward to its extreme position, substantially as described.

Signed at Baltimore, Maryland, this 24th day of December, A. D. 1892.

FERDINAND GROSHANS.

Witnesses:
JOHN L. HEBB,
THOMAS J. DAIL.